United States Patent [19]
Inoue et al.

[11] Patent Number: 5,618,615
[45] Date of Patent: Apr. 8, 1997

[54] GRAPHITE LAYER MATERIAL

[75] Inventors: Takao Inoue, Hirakata; Junji Ikeda, Ikoma; Naomi Nishiki, Kyoto, all of Japan

[73] Assignee: Matsushita Electric Industrial Co., Ltd., Osaka-fu, Japan

[21] Appl. No.: 498,224

[22] Filed: Jul. 5, 1995

[30] Foreign Application Priority Data

Jul. 6, 1994 [JP] Japan ............................... 6-154626

[51] Int. Cl.$^6$ .................................................. H01M 4/00
[52] U.S. Cl. ................... 428/315.5; 428/312.2; 428/408; 428/696
[58] Field of Search ........................ 428/408, 696, 428/312.2, 315.5, 704; 204/284, 290 R, 294; 429/194, 209, 218

[56] References Cited

U.S. PATENT DOCUMENTS

| | | | |
|---|---|---|---|
| 4,358,046 | 11/1982 | Detz et al. ............................ | 228/176 |
| 4,749,514 | 6/1988 | Murakami ............................ | 252/500 |
| 4,978,600 | 12/1990 | Suzuki ................................. | 429/218 |
| 5,340,670 | 8/1994 | Takami ................................ | 429/194 |

FOREIGN PATENT DOCUMENTS

| | | |
|---|---|---|
| 870183 | 5/1971 | Canada . |
| 0223047 | 5/1987 | European Pat. Off. . |
| WO89/07577 | 8/1989 | WIPO . |

OTHER PUBLICATIONS

M. Murakami, "Manufacture Of Graphite Cathodes For Bateries", Chemical Abstracts, vol. 117, No. 10, Abstract No. 93745u, Sep. 7, 1992.

M. Murakami et al., "Manufacture Of Graphite Cathodes For Batteries", Chemical Abstracts, vol. 118, No. 2, Abstract No. 9355g, Jan. 11, 1993.

T. Hirano et al., "Secondary Nonaqueous Batteries With Carbon–Fiber Electrode", Chemical Abstracts, vol. 111, No. 6, Abstract No. 42852v, Aug. 7, 1989.

T. Koyama et al., "Plane–Oriented Graphite Films From Pyrolysis Of Hydrocarbons", Chemical Abstracts, vol. 79, No. 14, Abstract No. 80908w, Oct. 8, 1973.

Patent Abstracts of Japan, unexamined applications, E filed, vol. 13, No. 166, Apr. 20, 1989, The Patent Office Japanese Government, p. 119 E 746; & JP–A–64 000 645 (Yazaki Corp.).

Patent Abstracts of Japan, unexamined applications, C filed, vol. 17, No. 285, Jun. 2, 1993, The Patent Office Japanese Government, p. 134 C 1066; & JP–A–05 017 116 (Matsushita).

Patent Abstracts of Japan, unexamined applications, C filed, vol. 17, No. 285, Jun. 2, 1993, The Patent Office Japanese Government, p. 134 C 1066; & JP–A–05 017 115 (Matsushita).

Patent Abstracts of Japan, unexamined applications, C filed, vol. 13, No. 249, Jun. 9, 1989, The Patent Office Japanese Government, p. 150 C 605; & JP–A–01 056 356 (Matsushita).

Primary Examiner—Archene Turner
Attorney, Agent, or Firm—Wenderoth, Lind & Ponack

[57] ABSTRACT

The present invention provides a graphite layer material to be used as an electrode material which exhibits excellent cell characteristics when used for a secondary cell. The graphite layer material of the present invention comprises highly oriented graphite layers of which a direction of crystalline orientation is adjusted to a planar direction, and an intercalant being inserted between the graphite layers.

9 Claims, 1 Drawing Sheet

GRAPHITE LAYER MATERIAL

FIELD OF THE INVENTION

The present invention relates to a graphite layer material. More particularly, it relates to a graphite layer material which is used for a graphite electrode for a secondary cell.

BACKGROUND OF THE INVENTION

Graphites are important as industrial materials because of their useful characteristics such as excellent heat and chemical resistances, high conductivity, etc., and have been widely used as electrode materials for secondary cells, heating elements, structural materials, gaskets, heat resistant sealing materials and the like.

Examples of the conventional graphite to be used for these applications include the following.

(a) Graphite which is mainly composed of natural graphite: It is produced by mixing natural graphite powder or scale with a binder and molding the mixture, followed by sintering. The graphite is not composed of graphite only, but is a mixture of graphite and carbon.

(b) Film graphite: It is produced by a so-called "expand process", in which natural graphite is dipped in a solution mixture of concentrated sulfuric acid and concentrated nitric acid, and then heated to expand an interlayer gap of the graphite, followed by rinsing to remove acid and subjecting to high-pressure press molding to form film graphite. However, this film graphite is inferior to a single crystal graphite in various characteristics, and its film strength is also low. Further, there is problem that a large amount of the acid is required for the production and toxic gas (e.g. $SO_x$, $NO_x$, etc.) is generated. Also, there is a problem that the acid used in the production is not completely removed and the remaining acid exudes when using the graphite to cause metal corrosion.

The electrode for secondary cell using the graphite or carbon is used by bringing lithium into contact with the graphite, forming an interlayer compound which is obtained by inserting lithium between layers of the graphite to cause dedoping/doping to take electric current out. In this case, the cell characteristics are largely influenced by the properties of the graphite or carbon electrode, and are not always good.

Highly oriented graphite has recently been studied as novel graphite. One of them is a so-called "HOPG (Highly Oriented Pyrolytic Graphite)" which is obtained by depositing carbon atoms on a substrate using a hydrocarbon gas by a CVD (Chemical Vapor Deposition) process, followed by annealing. The HOPG is one in which the orientation direction of a crystal is adjusted to one direction. Another highly oriented pyrogenic graphite which is obtained by a different production process is described in Japanese Laid-Open Patent Publication Nos. 3-75211, 4-21508, etc. The graphites can be produced in a short time and have a desired size and excellent physical properties approaching those of a homogeneous single crystal, which causes no problem due to the residual acid described in the above item (b).

Regarding a secondary cell using a conventional graphite and a carbon, the cell characteristics are largely influenced by the properties of the graphite or carbon electrode, and the cell is not superior in cell characteristics.

OBJECTS OF THE INVENTION

One object of the present invention is to provide a graphite layer material, comprising a highly oriented graphite and an intercalant, the intercalant being inserted between layers of the highly oriented graphite, which is used as an electrode material exhibiting excellent cell characteristics when used for a secondary cell.

Another object of the present invention is to provide a graphite layer material which exhibits excellent cell characteristics when used for a secondary cell, by inserting an intercalant between layers of a highly oriented graphite, rapidly and uniformly, to control an amount of the intercalant to be inserted.

These objects as well as other objects and advantages of the present invention will become apparent to those skilled in the art from the following description with reference to the accompany drawings.

SUMMARY OF THE INVENTION

Figure 1:
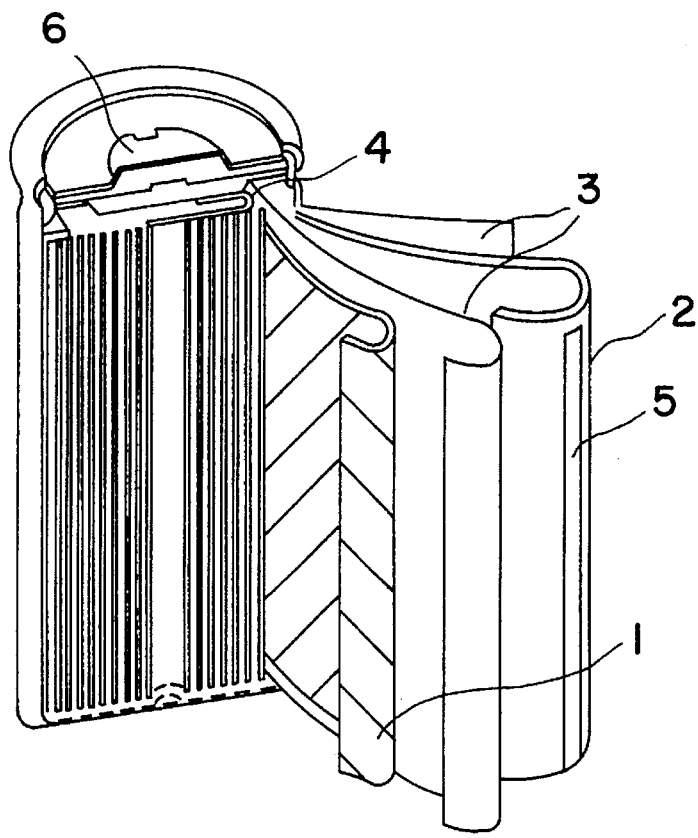
FIG. 1 is a sectional view illustrating a lithium secondary cell using the graphite layer material of one embodiment of the present invention as a graphite electrode material for secondary cell.

The present inventors have studied intensively in order to solve the above mentioned problems. It has been found that preferred characteristics can be obtained when using a highly oriented graphite of which a direction of crystalline orientation is adjusted to a planar direction as the graphite. It has also been found that, when an intercalant is inserted between the highly oriented graphite layers, most of the intercalant is inserted in the direction parallel to the direction of crystalline orientation through an interlayer gap at an end surface of the graphite, and strong carbon skeleton disturbs the insertion of the intercalant from the direction perpendicular to the direction of crystalline orientation. It also becomes clear that it takes a long time to insert the intercalant between the highly oriented graphite layers because the intercalant is inserted between layers from approximately parallel direction to the orientation direction of the crystal. Further it becomes clear that, the intercalant is inserted, more rapidly, as it comes near to the end surface of the highly oriented graphite and, further, it takes a longer time to insert the intercalant as it goes away from the end surface and, therefore, the intercalant is not inserted, uniformly. Furthermore, it becomes clear that it is difficult to control an amount of the intercalant to be inserted at a desired amount.

That is, the present invention provides a graphite layer material which comprises highly oriented graphite layers of which a direction of crystalline orientation is adjusted to a planar direction, and an intercalant inserted between the graphite layers.

DETAILED DESCRIPTION OF THE INVENTION

The graphite layer material of the present invention is characterized, in that an intercalant is inserted between highly oriented graphite layers of which a direction of crystalline orientation is adjusted to a planar direction.

The intercalant to be used is preferably a donative intercalant, preferably at least one selected from the group consisting of chloride and fluoride.

It is preferred that the highly oriented graphite layer material is provided with a large number of micropores.

It is preferred that the highly oriented graphite layer material is that obtained by graphitizing polymer film.

Preferred polymer film is made from at least one selected from the group consisting of polyoxadiazole, polybenzothiazole, polybenzobisthiazole polybenzoxazole, polybenzobisoxazole, polyimide, polyamide, polyphenylenebenzoimidazole, polyphenylenebenzimidazole, polythiazole and polyparaphenylenevinylene.

It is preferred that the graphitization is conducted by calcining at a temperature of not less than 2000° C.

It is preferred that the highly oriented graphite planar material has flexibility.

Preferred intercalant is at least one selected from the group consisting of Li, K, Rb, Cs, Sr and Ba.

Further, it is preferred that a size of the micropore is 1 to 100 μm.

Hereinafter, the present invention will be explained in detail.

The highly oriented graphite layer material to be used for the graphite layer material of the present invention may be one that a direction of crystalline orientation is adjusted to a planar direction. Examples thereof include one which is obtained by depositing carbon atoms on a substrate by a CVD process using a hydrocarbon gas, followed by annealing; one which is obtained by graphitizing polymer film; and the like. Among them, one which is obtained by graphitizing polymer film is preferably used because the intercalant can be inserted between the resulting graphite layers, rapidly and uniformly.

It is more preferred to use polymer film made from at least one selected from the group consisting of polyoxadiazoles (POD), polybenzothiazole (PBT), polybenzobisthiazole (PBBT), polybenzoxazole (PBO), polybenzobisoxazole (PBBO), polyimides (PI), polyamides (PA), polyphenylenebenzimidazole (PBI), polyphenylenebenzbisimidazole (PPBI), polythiazole (PT) and polyparaphenylenevinylene (PPV), because the intercalant can be inserted between the resulting graphite layers, rapidly and uniformly.

Polyoxadiazoles include polyparaphenylene-1,3,4-oxadiazole and an isomer thereof.

Polyimides include aromatic polyimides represented by the formula (1):

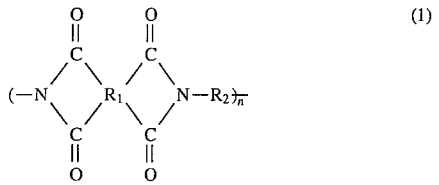

wherein $R_1 =$

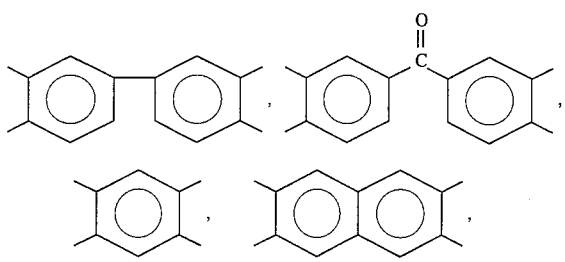

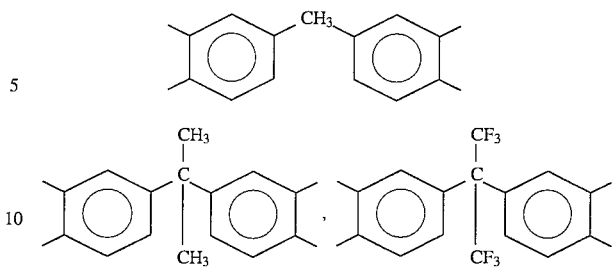

and $R_2 =$

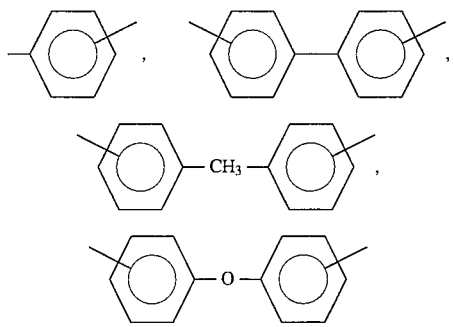

Polyamides include aromatic polyamides represented by the formula: (2):

$$-(R_3C-NH-R_4-N-C)_{\overline{n}} \quad (2)$$
$$\phantom{-(R_3C-NH-R_4-}H$$

(with O double-bonded to each C)

wherein

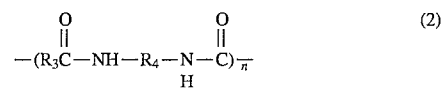

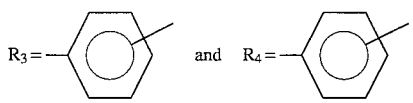

Polyimides and polyamides to be used are not limited to those which have the above structure.

The calcining condition for graphitizing the polymer film is not specifically limited, but is preferably at a temperature of not less than 2000° C., more preferably about 3000° C. because the intercalant can be inserted between the resulting graphite layers, rapidly and uniformly. The calcining is normally conducted in an inert gas. A thickness of the polymer film is preferably not less than 100 μm, in order to inhibit influence of a gas to be generated in the process of the graphitization by adjusting a treating atmosphere to a pressure atmosphere at the time of calcining. The pressure at the time of calcining varies depending upon a film thickness, but is preferably within a range of 0.1 to 50 kg/cm². When calcining at the maximum temperature of less than 2000° C., the resulting graphite is hard and brittle and it is likely to become difficult to form an interlayer compound. After calcining, a sheeting treatment may be optionally conducted.

The polymer film is graphitized, for example, by a process comprising cutting the polymer film into pieces having a suitable size, introducing one cut film or a laminate of about 1000 cut films in a calcining furnace, heating to 3000° C. to graphitize the film or laminate. After calcining, the graphitized film or laminate may be optionally subjected to a sheeting treatment, as described above.

The highly oriented graphite planar material thus obtained may take any form such as film, sheet, plate and the like. Further, it may be flexible or hard with no flexibility. The highly oriented graphite layer material having flexibility is preferred so as to use the graphite layer material of the present invention as the electrode material in an integrated form.

When using a film graphite as the electrode material, a thickness of the polymer film is preferably within a range of not more than 400 µm, more preferably 5 to 200 µm. When the thickness of the raw film exceeds 400 µm, the film changes into a degraded state by a gas to be generated from the interior of film in the heat treatment process. Therefore, it becomes difficult to use it alone as a good quality electrode material.

However, the graphite in the degraded state can be a useful electrode material if it is molded into a composite material with a fluorine resin such as polytetrafluoroethylene known as "Teflon". Further, it is also possible to use the graphite by making it powder to mold into a composite material with a fluorine resin. In case of composite material, the proportion (weight ratio) of the graphite to the fluorine resin is preferably within a range of 50:1 to 2:1.

As the intercalant, a donative one is suitable and is preferred as the electrode for secondary cell. It is more preferred that the intercalant is at least one selected from the group consisting of chloride and fluoride. As the chloride and fluoride, there can be used chlorides and fluorides of any metal.

When the intercalant is at least one selected from the group consisting of Li, K, Rb, Cs, Sr and Ba, the graphite layer material becomes an electrode material exhibiting excellent cell characteristics when used for a secondary cell.

Interlayer compounds having a different layer structure can be obtained from the same intercalant substance depending on reaction condition. The interlayer compound is formed by an interaction between a guest substance (intercalant) inserted between graphite layers as a host.

It is preferred that the highly oriented graphite layer material is processed so that it may have many micropores on its surface. By having the micropores on the surface of the layer material, the intercalant can be inserted between the graphite layers, rapidly and uniformly, to control the amount of the intercalant to be inserted, thereby exhibiting excellent cell characteristics when using the graphite layer material for the secondary cell. The method for forming the micropores on the surface of the layer material is not specifically limited, for example, the micropores may be perforated by subjecting to perforation processing using a press, or the micropores may be perforated using laser beam. The shape of the micropores is not specifically limited, and it takes any form such as circle, ellipse, polygon and the like.

The size of the micropore is not specifically limited, for example, it is 1 to 100 µm. When the size is within this range, it becomes possible to insert the intercalant between layers of the highly oriented graphite, more rapidly and uniformly, to precisely control the amount of the intercalant to be inserted. The size of the micropore is preferably 2 to 50 µm, more preferably 5 to 20 µm. A large number of micropores may be arranged on the surface of the layer material, regularly or irregularly. However, it is preferred that micropores are arranged regularly in order to insert the intercalant between the graphite layers, uniformly, to control the amount of the intercalant to be inserted.

The method for inserting the intercalant between the graphite layers through a large number of micropores on the surface of the highly oriented graphite layer material is not specifically limited, and examples thereof include vapor phase constant pressure reaction process, liquid phase contact process, solid phase pressure process, solvent process and the like. The intercalant is diffused between the graphite layers by an action such as capillary action through a large number of micropores on the surface of the highly oriented graphite layer material. Thus, the intercalant can be inserted between the graphite layers, rapidly and uniformly, to control the amount of the intercalant to be inserted.

As described above, a strong carbon skeleton does not disturb the insertion of the intercalant from the direction perpendicular to the direction of crystalline orientation and, therefore, the intercalant can be inserted between layers of the graphite from the direction perpendicular to the orientation of the crystal through a large number of micropores. Not only the intercalant is inserted between layers through a large number of micropores, but also it is sometimes inserted in the direction parallel to the orientation direction of the crystal through an interlayer gap between layers at the end surface of the graphite.

The graphite layer material obtained by inserting the intercalant between graphite layers of the highly oriented graphite planar material thus obtained may be subjected to a dedoping treatment. The method for conducting the dedoping process is not specifically limited, for example there can be used a method for conducting a heat treatment by washing with water or water vapor at elevated temperature. The graphite interlayer compound changes into the state where the interaction between layers is deteriorated by subjecting to the dedoping treatment, and excellent cell characteristics can be exhibited when using the graphite layer material as a cell material.

The graphite layer material obtained according to the present invention is preferably used as an electrode material of a positive electrode of the secondary cell using lithium as a negative electrode, particularly.

The graphite layer material of the present invention can exhibit doping and dedoping actions, thereby exhibiting excellent cell characteristics, because the intercalant is inserted between layers of the highly oriented graphite layer material of which a direction of crystalline orientation is adjusted to a planar direction.

Further, since a large number of micropores are provided on the surface of the highly oriented graphite planar material wherein the orientation direction of the crystal is adjusted to the planar direction, the intercalant can be inserted between layers through these micropores.

As described above, the graphite layer material of the present invention can be used as an electrode material exhibiting excellent cell characteristics when using for a secondary cell, because it comprises a highly oriented graphite layer material of which a direction of crystalline orientation is adjusted to a planar direction, and an intercalant inserted between the graphite layers.

It can be preferably used as an electrode for secondary cell when the intercalant is a donative intercalant. It is more preferred that the intercalant is at least one sort selected from the group consisting of chloride and fluoride.

When the highly oriented graphite planar material is provided with a large number of micropores, there can be provided a graphite layer material exhibiting excellent cell characteristics when using for a secondary cell, by inserting an intercalant between layers of the highly oriented graphite, rapidly and uniformly, to control the amount of the intercalant to be inserted.

When the highly oriented graphite planar material is that obtained by graphitizing polymer film, a donative intercalant can be inserted between layers of the graphite, more rapidly and uniformly.

When the polymer film is made from at least one selected from the group consisting of polyoxadiazole, polybenzothiazole, polybenzobisthiazole, polybenzoxazole, polybenzobisoxazole, polyimide, polyamide, polyphenylenebenzoimidazole, polyphenylenebenzbisimidazole, polythiazole and polyparaphenylenevinylene and the graphitization is conducted by calcining within a temperature range of not less than 2000° C., a donative intercalant can be inserted between layers of the graphite, more rapidly and uniformly.

When the highly oriented graphite planar material has flexibility, it becomes possible to use the graphite layer material of the present invention as the electrode material in the integrated form.

When the intercalant is at least one sort selected from the group consisting of Li, K, Rb, Cs, Sr and Ba, it becomes an electrode material exhibiting excellent cell characteristics when using for a secondary cell.

When a size of the fine pore is 1 to 100 μm, it becomes possible to insert an intercalant between layers of the graphite, more rapidly and uniformly, to precisely control the amount of the intercalant to be inserted.

EXAMPLES

The following Examples and Comparative Examples further illustrate the present invention in detail but are not to be construed to limit the scope thereof.

Example 1

A polyparaphenylene-1,3,4-oxadiazole film having a thickness of 50 μm was subjected to a preliminary heat treatment by heating to 1000° C. at a rate of 10° C./minute in a nitrogen gas, using an electric furnace (model LTF-8, manufactured by Sankyo Denro (Do. Ltd.) and maintaining at 1000° C. for one hour. Then, the resulting carbonaceous film was set stretchably in a graphite cylindrical container and heated at a rate of 20° C./minute, using an ultrahigh temperature furnace (model 46-5, manufactured by Shinsei Denro Co. Ltd.). The film was calcined so that the maximum temperature may become 2000°, 2500° and 3000° C., respectively, to obtain three graphites. For comparison, a graphite (Comparative Example) was obtained by calcining at the maximum temperature of 1800° C. lower than 2000° C. Incidentally, the calcining was conducted in an argon gas under pressure (0.2 kg/cm²).

The graphitized film thus obtained had flexibility. After this film was set in a pyrex glass container so that it may contact directly with metal lithium and metal sodium, the container was sealed under vacuum and subjected to a heat treatment at 150° C.

Regular micropores (10 μm) were perforated on the surface of a separate graphitized film having flexibility obtained above, using a press. After the film having micropores was set in a pyrex glass container so that it may contact directly with metal lithium and metal sodium, the container was sealed under vacuum and subjected to a heat treatment at 150° C.

In case of graphite calcined at a temperature of not less than 2000° C. in the respective Examples, an interlayer compound at the second stage could be obtained. However, in case of graphite calcined at 1800° C. in the Comparative Example, no interlayer compound could be obtained.

A lithium secondary cell of a structure as shown in FIG. 1 was prepared by using the resulting graphite layer material as a positive electrode 1 of an electrode material and subjecting the positive electrode to pressure molding in an inert gas, together with a polypropylene separator 3 having a porous structure and a lithium metal as a negative electrode 2. Incidentally, as an electrolyte solution, a solution comprising propylene carbonate containing lithium perchlorate, and 1,2-dimethoxyethane is used.

This secondary cell has excellent charging/discharging characteristics. On the other hand, in case of graphite of the Comparative Example, no satisfactory characteristics were obtained because no interlayer. compound was formed Further, the calcining temperature and charging/discharging characteristics are mutually related. The higher the calcining temperature, the more the characteristics were improved. It became clear that the characteristics are improved when micropores are perforated.

Example 2

The graphite layer material of Example 1 as the electrode material was allowed to stand in air for 24 hours, subjected to a dedoping treatment by treating with boiling distilled water and then dried, before subjecting to pressure molding in an inert gas together with polypropylene having a porous structure and lithium metal. Then, according to the same manner as that described in Example 1, a secondary cell was prepared and the charging/discharging characteristics of the secondary cell were examined.

The secondary cell of Example 2 had excellent charging/discharging characteristics, similar to Example 1. On the other hand, in case of graphite of the Comparative Example, no satisfactory characteristics were obtained because no interlayer compound was formed. Further, the calcining temperature and charging/discharging characteristics are mutually related. The higher the calcining temperature, the more the characteristics were improved. It became clear that the characteristics are improved when micropores are perforated.

Example 3

Figure 2:
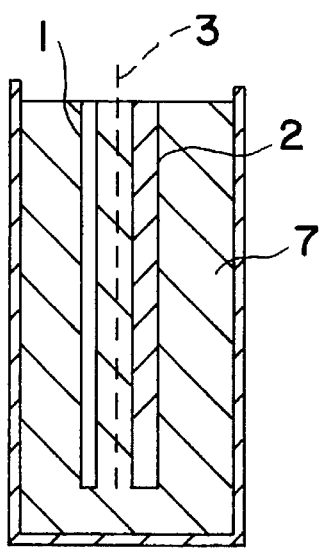
FIG. 2 is a sectional view illustrating a lithium secondary cell using the graphite layer material of another embodiment of the present invention as a graphite electrode material for secondary cell.

According to the same manner as that described in Example 1 except that a laminate of one thousand polyparaphenylene-1,3,4-oxadiazole films having a thickness of 50 μm was calcined, a graphitized plate was obtained. This plate had a flexibility. Then, according to the same manner as that described in Example 1, a secondary cell as shown in FIG. 2 was prepared and the charging/discharging characteristics of the secondary cell were examined.

The secondary cell of Example 3 had excellent charging/discharging characteristics, similar to Example 1. Further, the calcining temperature and charging/discharging characteristics are mutually related. The higher the calcining temperature, the more the characteristics were improved.

Further, regular micropores (10 μm) were perforated on the surface of the graphitized plate having a flexibility obtained above by laser beam. Then, according to the same manner as that described in Example 1, a secondary cell as shown in FIG. 2 was prepared and the charging/discharging characteristics of the secondary cell were examined.

The secondary cell of Example 3 had excellent charging/discharging characteristics, similar to Example 1. Further, the calcining temperature and charging/discharging characteristics are mutually related. The higher the calcining temperature, the more the characteristics were improved.

Example 4

According to the same manner as that described above except that polyimide films (Capton H film, manufactured by Du Pont Co.) having a thickness of 125, 25, 50 and 75 μm were used, respectively, and the maximum temperature at the time of calcining was 2800° C., a graphitized interlayer compound was prepared, respectively. Further, it was subjected to a dedoping treatment and the cell characteristics were examined according to the same manner as that described above. As a result, any film exhibited excellent cell characteristics, similar to Example 1.

Example 5

According to the same manner as that described above except that respective films (PI, POD, PBT, PBBT, PBO, PBBO, PPA, PBI, PPBI, PT and PPV) having a thickness of 50 μm was used and calcined at the maximum temperature of 3000° C. under pressure of 2.0 kg/cm² and, at the same time, potassium was inserted between layers using a vapor phase constant pressure reaction process (Two-bulb process), a graphitized interlayer compound was formed, respectively. Further, it was subjected to a dedoping treatment and the cell characteristics were examined according to the same manner as that described above. As a result, any film exhibited excellent cell characteristics, similar to Example 1. Incidentally, the potassium-side temperature and graphite-side temperature were set at 250° and 300° C., respectively when an interlayer compound is formed to obtain an interlayer compound at the first stage.

Example 6

According to the same manner as that described in Example 1, POD and PI films having a thickness of 400 μm were subjected to a heat treatment. Although the films are in the degraded state, a graphite interlayer compound was obtained according to the same manner as that described in Example 1. Further, the compound was subjected to a dedoping treatment to prepare a composite material of a graphite material and Teflon. The weight ratio of the graphite material to Teflon was 10:1. Then, the cell characteristics were examined according to the same manner as that described in Example 1. As a result, the resulting cell exhibited excellent cell characteristics.

What is claimed is:

1. A graphite layer material comprising highly oriented graphite layers of which a direction of crystalline orientation is adjusted to a planar direction, and an intercalant being inserted between the graphite layers, wherein said highly oriented graphite layers are provided with micropores.

2. The graphite layer material according to claim 1, wherein said intercalant is donative.

3. The graphite layer material according to claim 1 wherein said intercalant is at least one member selected from the group consisting of chlorides and fluorides.

4. The graphite layer material according to claim 1 wherein said highly oriented graphite layers are obtained by graphitizing polymer film.

5. The graphite layer material according to claim 4, wherein said polymer film is made from at least one member selected from the group consisting of polyoxadiazole, polybenzothiazole, polybenzobisthiazole, polybenzoxazole, polybenzobisoxazole, polyimide, polyamide, polyphenylenebenzoimidazole, polyphenylenebenzimidazole, polythiazole and polyparaphenylenevinylene.

6. The graphite layer material according to claim 4, wherein the graphitization is conducted by calcining at a temperature of not less than 2000° C.

7. The graphite layer material according to claim 1, wherein said highly oriented graphite layers have flexibility.

8. The graphite layer material according to claim 1, wherein said intercalant is at least one member selected from the group consisting of Li, K, Rb, Cs, Sr and Ba.

9. The graphite layer material according to claim 1, wherein said micropores have a pore diameter of 1 to 100 μm.

* * * * *